United States Patent [19]

Imai et al.

[11] Patent Number: 4,710,554

[45] Date of Patent: Dec. 1, 1987

[54] POLYBUTADIENE AND PROCESS FOR PREPARING THE SAME

[75] Inventors: Akio Imai, Ichihara; Yasushi Okamoto, Ibaraki; Masatoshi Saito, Ichihara, all of Japan

[73] Assignee: Sumitomo Chemical Company, Limited, Osaka, Japan

[21] Appl. No.: 829,846

[22] Filed: Feb. 14, 1986

Related U.S. Application Data

[63] Continuation of Ser. No. 703,896, Feb. 21, 1985, abandoned.

[30] Foreign Application Priority Data

Feb. 27, 1984 [JP] Japan .................................. 59-37150

[51] Int. Cl.$^4$ .............................................. C08F 4/48
[52] U.S. Cl. ................ 526/180; 525/332.3; 526/181; 526/335

[56] References Cited

U.S. PATENT DOCUMENTS

| | | | |
|---|---|---|---|
| 3,801,554 | 4/1974 | Selman | 526/335 |
| 3,879,366 | 4/1975 | Selman | 526/335 |
| 3,937,681 | 2/1976 | Nordsiek | 525/342 |
| 4,020,258 | 4/1977 | Farrar | 526/335 |
| 4,022,959 | 5/1977 | Sommer | 526/335 |
| 4,340,685 | 7/1982 | Takeuchi | 526/335 |
| 4,429,091 | 1/1984 | Hall | 526/181 |
| 4,523,618 | 6/1985 | Yamamoto et al. | 525/332.9 |

*Primary Examiner*—Paul R. Michl
*Attorney, Agent, or Firm*—Stevens, Davis, Miller & Mosher

[57] ABSTRACT

A polybutadiene having an average 1,2-bond content of 18 to 32% by mole, a branched polymer chain content of 60% by weight or more and a Mooney viscosity at 100° C. of 40 to 90, the viscosity of a 5% by weight concentration solution of this polybutadiene in styrene at 25° C. being 60 to 90 cps, and a process for preparing the polybutadiene comprising starting the polymerization of 1,3-butadiene in an inert hydrocarbon solvent in the presence of a Lewis basic compound and an organolithium compound, the latter compound being in an amount of 0.5 to 3 millimoles per 100 g of 1,3-butadiene, at a temperature selected from the range of 30° to 80° C., carrying out the polymerization by controlling the temperature so that the temperature at the end of polymerization may be 5° to 40° higher than the temperature at the start of polymerization, and adding to the resulting polymer solution a polyfunctional halogen compound in an amount of 0.6 to 1 equivalent per equivalent of the organolithium compound to further react the polymer with the polyfunctional halogen compound.

15 Claims, No Drawings

POLYBUTADIENE AND PROCESS FOR PREPARING THE SAME

This application is a continuation of application Ser. No. 703,896, filed Feb. 21, 1985, now abandoned.

This invention relates to polybutadienes, particularly to a novel polybutadiene which is suitable for improving various properties such as impact strength, luster, etc., of resinous polymers such as, typically, styrene polymer (PS) and polymethyl methacrylate (PMMA), and a process for preparing such polybutadiene.

Recently, synthetic resins such as PS and PMMA are used in great quantities in many fields of industry and for various purposes such as the manufacture of parts of automobiles, household electric appliances, etc., and accordingly the improvements of their mechanical properties and visual appearance characteristics such as luster are strongly required. In the case of PMMA, for instance, it is required to improve both impact strength and transparency at the same time, and in the case of PS, simultaneous improvement of impact strength and surface luster is required.

It has been known to mix butadiene rubber or to graft polymerize methyl methacrylate monomer or styrene monomer in the presence of butadiene rubber for improving the impact strength of said resinous polymers.

However, use of commercially available polybutadiene with a high cis content (so-called high-cis BR) as said butadiene rubber cannot provide a satisfactory impact strength-improving effect and, in some cases, the obtained resin product is tinted. Also, the impact strength may rather be lowered due to presence of gel substance. On the other hand, use of commercial polybutadiene with a relatively high trans content (so-called low-cis BR) synthesized with a lithium type polymerization initiator can keep the gel content relatively low and also provides a significant improvement of impact strength, but problems exist in this case, too. It is necessary to increase the amount of polybutadiene used or to increase the average molecular weight of polybutadiene for achieving a further improvement of impact strength, but this invites a deterioration of luster or transparency of the resin product. Thus, it has been impossible for either of said types of polybutadiene to improve both impact strength and appearance characteristics of resinous polymers at the same time.

In view of the above, the present inventors have pursued further studies for developing a new type of polybutadiene which is effective for improving both impact resistance and appearance characteristics of resinous polymers as mentioned above, and as a result, have succeeded in developing a novel polybutadiene having a specific structure and capable of achieving said object. The present invention has been realized on the basis of such achievement.

Thus, the present invention provides a novel polybutadiene having branched polymer chains obtained by polymerizing 1,3-butadiene in the presence of an organolithium compound and a Lewis basic compound and further reacting the produced polymer with a polyfunctional halogen compound, said polybutadiene being characterized in that the average 1,2-bond content is 18 to 32% by mole, that the branched polymer chain content is 60% by weight or more, that the Mooney viscosity at 100° C. is 40 to 90, and that the viscosity of a 5% by weight concentration solution of polybutadiene in styrene at 25° C. is 60 to 90 cps. Such polybutadiene can be produced by starting polymerization of 1,3-butadiene in an inert hydrocarbon solvent in the present of a Lewis basic compound and an organolithium compound, the latter compound being used in an amount of 0.5 to 3 millimoles per 100 g of 1,3-butadiene, at a temperature selected from the range from 30° to 80° C., carrying out the polymerization under temperature control such that the temperature at the end of polymerization may be 5° to 40° C. higher than the temperature at the start of polymerization, and adding to the obtained polymer solution a polyfunctional halogen compound in an amount of 0.6 to 1 equivalent per equivalent of organolithium compound for further reacting said polymer.

As the organolithium compound used in the preparation of said polybutadiene, there can be employed hydrocarbon compounds containing a lithium atom such as n-propyllithium; isopropyllithium, n-butyllithium, sec-butyllithium, t-butyllithium, n-pentyllithium and the like which are the polymerization initiators for the so-called "living anionic polymerization". Such compounds are usually used in an amount of 0.5 to 3 millimoles per 100 g of 1,3-butadiene.

If the amount of organolithium compound used is less than 0.5 millimole, the viscosity of the polymerization system rises to not only cause difficulties in the removal of reaction heat, control of reaction temperature and recovery of polybutadiene but also result in an excessively high molecular weight of the produced polybutadiene. On the other hand, use of said organolithium compound in excess of 3 millimoles results in a too low molecular weight of the produced polybutadiene.

As the Lewis basic compound, there can be used ethers such as diethyl ether, dibutyl ether, tetrahydrofuran, ethylene glycol dimethyl ether, ethylene glycol dibutyl ether, diethylene glycol dimethyl ether, diethylene glycol dibutyl ether and the like or tertiary amines such as triethylamine, tributylamine, N,N,N',N'-tetramethylethylenediamine and the like, these compounds being usable either solely or as a mixture of two or more of them.

The average 1,2-bond content of polybutadiene according to this invention is defined to be in the range of 18 to 32% by mole, preferably 20 to 30% by mole. If said average 1,2-bond content is below the above-defined range, the resulting resin product proves poor in luster and transparency, while if said content exceeds said range, the resin product becomes low in impact strength.

The desired control of 1,2-bond content can be effected by properly selecting the type and the amount of Lewis basic compound used and incorporating it in the system at the time of polymerization of 1,3-butadiene. For instance, in case of using diethylene glycol dimethyl ether as said Lewis basic compound, the amount thereof used should be 0.05 to 0.15 mole per mole of organolithium compound.

It is desirable that the distribution of 1,2-bond content is oriented in the lengthwise direction of the polymer chain, and it is particularly preferable that the value of 1,2-bond content (% by mole) in the 10% length portion of the polymer chain from its polymerization starting end is 3 to 20% by mole higher than the value of 1,2-bond content (% by mole) in the 10% length portion of the chain from its polymerization terminating end.

This polymerization reaction is carried out in an inert hydrocarbon solvent such as n-hexane, n-heptane, cyclohexane, benzene, toluene, xylene and the like.

Polymerization temperature is an important factor in the production of polybutadiene according to this invention, and it is desirable to control the polymerization temperature such that the average temperature of the reaction system at a point before reaching 10% conversion may be 5° to 40° C. lower than the average temperature of the reaction system at a point after reaching 90% conversion but before the end of the polymerization.

In more concrete terms, the polymerization is started at a temperature selected from the range from 30° to 80° C., and by utilizing the polymerization reaction heat or by supplying heat from the outside, the polymerization temperature being controlled such that the temperature at the end of the polymerization may be in the range of 35° to 120° C. and furthermore 5° to 40° C. higher than the starting temperature of polymerization.

If the polymerization starting temperature is below 30° C., the polymerization reaction rate becomes impractically low, while if the starting temperature is higher than 80° C., it becomes difficult to control the reaction temperature and also the molecular weight distribution of the produced polybutadiene tends to change unstably, and when, for instance, an impact-resistant polystyrene resin is produced by using such polybutadiene as starting material, the resulting resin lacks quality stability and, in particular, proves poor in visual properties such as surface luster.

It is also desirable that the temperature at the end of polymerization reaction is high in view of economy in the industrial practice of the process, but if such temperature exceeds 120° C., it becomes difficult to control the average 1,2-bond content of produced polybutadiene at the range of 18 to 32% by mole. This also leads to a disadvantage of necessitating a large amount of a Lewis basic compound. Further, the control of molecular weight distribution of polybutadiene becomes difficult, and the resin produced by using such polybutadiene is deteriorated in visual appearance properties.

The polybutadiene of this invention is characterized by containing 60% by weight or more, preferably 80% by weight or more of branched polymer chains formed by reacting a polyfunctional halogen compound with the active polymerization terminal of a polymer obtained from said polymerization reaction. If the content of said branched polymer chain is less than 60% by weight, the viscosity of the system becomes exceedingly high in producing a resin by mixing a monomer such as styrene or methyl methacrylate with the polybutadiene. Also, the produced resin proves to be poor in stability and reproducibility of mechanical properties.

The content of branched polymer chains can be controlled by adjusting the quantity ratio of the polyfunctional halogen compound to the organolithium compound used as a polymerization initiator. For instance, one or a mixture of two or more of polyfunctional halogen compounds such as dimethylsilicon dichloride, monomethylsilicon trichloride, silicon tetrachloride, tin tetrachloride, germanium tetrachloride and the like is used in an amount of 0.6 to 1 equivalent per equivalent of organolithium compound, and it is added to the polymer solution obtained from said polymerization and reacted with the active polymerization terminal of the polymer.

The molecular weight of polybutadiene according to this invention should be such that the following conditions are met: the Mooney viscosity at 100° C. is 40 to 90; and the viscosity of a 5% by weight concentration solution of polybutadiene in styrene at 25° C. is 60 to 90 cps.

If the molecular weight is too small to fulfill these conditions, the produced resin proves low in impact strength or poor in stability and reproducibility of properties. On the other hand, if the molecular weight is too large to meet said conditions, the produced resin has poor appearance properties such as luster. Also, difficulties will be caused in stirring and mixing materials in an apparatus in the synthesis of a resin, making it unable to maintain the uniformness of the resin product quality.

The polybutadiene of this invention is further characterized by a favorable small value of cold flow and easy miscibility at the time of dissolution, owing to the fact that the values of Mooney viscosity (ML) and solution viscosity (SV) substantially satisfy the relation of $0.7 \times ML \leq SV \leq 1.3 \times ML$.

In use of the polybutadiene of this invention as a starting material for the production of resins, the viscosity of the system can be maintained in a range that enables homogeneous mixing operation in an ordinary stirring or mixing tank, so that the produced resin can be maintained uniform in qualities. This invention has also provided a great progress in the art in that it has realized simultaneous improvement of both visual appearance properties such as surface luster and mechanical properties such as impact strength of a resin, which has been quite difficult in the conventional techniques.

The present invention will be further illustrated below by way of the embodiments thereof.

EXAMPLES 1-3 & COMPARATIVE EXAMPLES 1-5

An autoclave having an internal volume of 10 liters and equipped with a stirrer and a jacket had its interior atmosphere sufficiently replaced with dry nitrogen gas, and into this autoclave were fed 7 liters of dry cyclohexane, 1 kg of 1,3-butadiene and diethylene glycol dimethyl ether (varied in amount), with the internal temperature of the autoclave being adjusted at 40° C. Then n-butyllithium (varied in amount) was added to the mixture and the polymerization was started. After about 180-minute reaction under heating to approximately 60° to 70° C., tin tetrachloride (varied in amount) was added to continue the reaction for additional 30 minutes. To the resulting polymer solution was added 0.5 PHR (by weight) of 2,6-di-t-butyl-4-methylphenol as a stabilizer, and then the solvent was distilled off to obtain a polybutadiene.

The synthesis conditions and the structural analytical values of the produced polybutadienes in the respective examples are shown in Table 1. The polybutadienes of Comparative Examples 3 to 5 are those synthesized at a fixed polymerization temperature of 55° C.

The structural analysis of the produced polybutadienes was made in the manner described below.

1,2-bond content

Infrared absorption spectrophotometry was used. The average 1,2-bond content was measured with the finally synthesized polybutadienes.

For the determination of distribution of 1,2-bond content along the polybutadiene chain, the polymerization solution was sampled out at given time intervals in the course of polymerization of polybutadiene and the polymerization conversion and 1,2-bond content of each sample were measured by calculating the 1,2-bondcontent in the portion where the polymerization conversion was less than 10% and in the portion where the polymerization conversion was 90 to 100%.

Mooney viscosity

A Mooney viscometer set at 100° C. was used. After one-minute preheating and additional four-minute standing, the torque was read. (ML, 1+4, 100° C.).

Content of branched polymer chains

Toyo Soda's HLC-802UR was used, selecting columns of $10^3$, $10^4$, $10^6$ and $10^7$ as distributing columns, and a refractometer was used as a detector. The molecular weight distribution of the polymer was measured at 40° C. by using tetrahydrofuran (THF) as a developing solvent. The relative ratio of peak heights corresponding to the average molecular weights of branched polymer chains and unbranched polymer chains was calculated as the weight ratio of the respective polymer chains.

Solution viscosity

The viscosity of a solution having a polybutadiene concentration of 5% by weight in styrene monomer was measured by using a B-type rotating viscometer in a thermostat set at 25° C.

REFERENTIAL EXAMPLES 1-3 & COMPARATIVE REFERENTIAL EXAMPLES 1-5

By using the polybutadienes obtained in Examples 1-3 and Comparative Examples 1-5, 92 parts by weight of styrene monomer was added to 8 parts by weight of polybutadiene and the mixture was stirred and dissolved at room temperature. Then 0.08 part by weight of t-dodecylmercaptan was added and the mixture was stirred at 120° C. for 4 hours to obtain a polymer solution in which about 80% of styrene monomer was polymerized.

To 100 parts by weight of said polymer solution were added 150 parts by weight of water, 0.2 part by weight of aluminum hydroxide, 0.02 part by weight of sodium dodecylbenzenesulfonate, 0.3 part by weight of benzoyl peroxide and 0.05 part by weight of di-t-butyl peroxide, and the mixture was polymerized at 80° C. for 4 hours, then at 100° C. for 3 hours and finally at 130° C. for 5 hours. From the produced polymer slurry, the polymer was filtered out, washed with water and dried to obtain a polystyrene resin.

Each of the thus obtained polystyrene resins, prepared as a specimen, was worked into a pressed sheet by using an extruder and a compression molding machine, and subjected to a property evaluation. The results of evaluation are shown in Table 1.

The polybutadienes used in Referential Examples 1-3 and Comparative Referential Examples 1-5 are those obtained in Examples 1-3 and Comparative Examples 1-5, respectively.

Izod impact strength was determined according to JIS K-6871, and surface luster was evaluated by visually observing the surface of each pressed sheet and scored according to the following 5-point system.

| Score | Surface condition |
|---|---|
| 5 | Having an extremely high smoothness and a high-degree luster like metallic luster. Very good. |
| 4 | Having a high smoothness and good luster. |
| 3 | Luster is observed but rather dim. |
| 2 | Surface appears hazy and has little luster. |
| 1 | Surface carries irregular patterns as if soil has deposited thereon and has little luster. |

TABLE 1

| | | Example | | | Comparative Example | | | | |
|---|---|---|---|---|---|---|---|---|---|
| | | 1 | 2 | 3 | 1 | 2 | 3 | 4 | 5 |
| Polybutadiene | | | | | | | | | |
| Amount used | | | | | | | | | |
| n-butyllithium | (millimoles) | 8.2 | 9.5 | 8.7 | 11.0 | 17.5 | 12.0 | 7.2 | 5.0 |
| Diethylene glycol dimethyl ether | (millimoles) | 0.74 | 1.0 | 1.1 | — | 0.65 | 2.0 | 0.7 | 0.8 |
| Tin tetrachloride | (millimoles) | 1.3 | 2.3 | 1.9 | 2.8 | 4.2 | 3.0 | 0.5 | — |
| Structural analytical values | | | | | | | | | |
| Average 1,2-bond content | (mol %) | 20 | 25 | 28 | 9 | 14 | 40 | 20 | 25 |
| 1,2-bond content at starting end (H) | (mol %)* | 23 | 32 | 31 | 9 | 15 | 41 | 20 | 25 |
| 1,2-bond content at termination end (E) | (mol %)* | 19 | 23 | 26 | 9 | 13 | 40 | 20 | 25 |
| [H]-[E] | (mol %) | 4 | 9 | 5 | 0 | 2 | 1 | 0 | 0 |
| Mooney viscosity (ML, 1 + 4, 100° C.) | | 60 | 65 | 72 | 96 | 46 | 78 | 65 | 60 |
| Branched polymer chain content (%) | | 64 | 92 | 84 | 95 | 83 | 92 | 30 | 0 |
| Solution viscosity (5% styrene solution, 25° C.) | | 75 | 61 | 67 | 95 | 30 | 75 | 120 | 140 |

| | Referential example | | | Comparative referential example | | | | |
|---|---|---|---|---|---|---|---|---|
| | 1 | 2 | 3 | 1 | 2 | 3 | 4 | 5 |
| Properties | | | | | | | | |
| Izod impact strength (notched, kg · cm/cm) | 12.2 | 10.9 | 11.8 | 9.5 | 7.6 | 6.5 | 7.9 | 8.1 |
| Surface luster | 5 | 5 | 5 | 3 | 4 | 5 | 3 | 3 |
| Remarks | — | — | — | — | — | — | — | Stirring was difficult at the time of polystyrene polymerization |

*1,2-bond contents at the starting end and termination end are respectively the calculated values of 1,2-bond contents in the 10% chain length portions.

EXAMPLE 4

A polybutadiene was obtained by using the same autoclave and by following the same procedures of reaction and treatment as in Example 1.

In this example, however, the amounts of n-butyllithium, diethylene glycol dimethyl ether and tin tetrachloride used for the reaction were 8.7 millimoles, 1.0 millimole and 2.0 millimoles, respectively. Also, after starting the polymerization at 40° C., the polymerization was continued while slowly increasing the temperature so that the temperature reached 50° C. in 20 minutes and 70° C. in 50 minutes, and after conducting the reaction at 70° C. for 60 minutes, the reaction mixture was further reacted with tin tetrachloride. In the course of polymerization, a part of the polymerization solution was collected from the autoclave, and to this collected solution was immediately added methanol to stop the polymerization, and the resulting solution was used as a specimen for the determination of infrared absorption spectrum and polymerization conversion.

The 1,2-bond content in each chain length portion as calculated from the change of polymerization conversion and average 1,2-bond content are as shown in the following table.

| Chain length from polymerization starting end/ overall chain length | 1,2-Bond content in each chain length portion (mol %) | Average 1,2-bond content (mol %) |
| --- | --- | --- |
| 0–10% | 32 | 26 |
| 10–90% | 25 | |
| 90–100% | 23 | |

This polybutadiene also showed the following results of determination: Mooney viscosity at 100° C.=72; solution viscosity (5% polybutadiene solution in styrene at 25° C.)=66 cps; branched polymer chain content=85%.

REFERENTIAL EXAMPLE 4

By using the polybutadiene obtained in Example 4, an impact-resistant polystyrene was synthesized according to the procedure of Referential Example 1. This polystyrene showed an Izod impact strength of 13.2 kg.cm/cm and had a score of 5 on surface luster evaluation, indicating a good balance of improved properties.

COMPARATIVE REFERENTIAL EXAMPLE 6

A polystyrene resin was obtained by following the same procedure as Referential Example 1 but by using a commercial polybutadiene having an average 1,2-bond content of 13% by mole, a Mooney viscosity of 37 and a solution viscosity of 83 cps. This resin had an Izod impact strength of 9.6 kg.cm/cm and a score of 3 on the surface luster evaluation.

What is claimed is:

1. A process for producing a polybutadiene having branched polymer chains, said polybutadiene having an average 1,2-bond content of 18 to 32% by mole, a branched polymer chain content of 60% by weight or more and a Mooney viscosity at 100° C. of 40 to 90, the viscosity of a 5% by weight concentration solution of the polybutadiene in styrene at 25° C. being 60 to 90 cps, said process comprising starting the polymerization of 1,3-butadiene in an inert hydrocarbon solvent in the presence of a Lewis basic compound and an organomonolithium compound in an amount of 0.5 to 3 millimoles per 100 g of 1,3-butadiene at a temperature selected from the range of 30° to 40° C., conducting the polymerization while controlling the temperature so that the temperature at the end of the polymerization may be 20° to 40° C. higher than the temperature at the start of the polymerization, and adding to the resulting polymer solution of a polyfunctional halogen compound in an amount of 0.6 to 1 equivalent per equivalent of the organomonolithium compound to effect further reaction thereof.

2. A process according to claim 1, wherein the Lewis basic compound is an ether selected from the group consisting of diethyl ether, dibutyl ether, tetrahydrofuran, ethylene glycol dimethyl ether, ethylene glycol dibutyl ether, diethylene glycol dimethyl ether and diethylene glycol dibutyl ether and a tertiary amine selected from the group consisting of triethylamine, tributylamine and N,N,N',N'-tetramethylethylenediamine.

3. A process according to claim 2, wherein the Lewis basic compound is diethylene glycol dimethyl ether.

4. A process according to claim 1, wherein the organomonolithium compound is a hydrocarbon compound containing lithium selected from the group consisting of n-propyl-lithium, isopropyllithium, n-butyllithium, sec-butyllithium, t-butyllithium, and n-pentyllithium.

5. A process according to claim 2, wherein the organomonolithium compound is a hydrocarbon compound containing lithium selected from the group consisting of n-propyl-lithium, isopropyllithium, n-butyllithium, sec-butyllithium, t-butyllithium, and n-pentyllithium.

6. A process according to claim 4, wherein the organomonolithium compound is n-butyllithium.

7. A process according to claim 5, wherein the organomonolithium compound is n-butyllithium.

8. A process according to claim 1, wherein the polyfunctional halogen compound is selected from the group consisting of dimethylsilicon dichloride, monomethylsilicon trichloride, silicon tetrachloride, tin tetrachloride and germanium tetrachloride.

9. A process according to claim 2, wherein the polyfunctional halogen compound is selected from the group consisting of dimethylsilicon dichloride , monomethylsilicon trichloride, silicon tetrachloride, tin tetrachloride and germanium tetrachloride.

10. A process according to claim 8, wherein the polyfunctional halogen compound is tin tetrachloride.

11. A process according to claim 9, wherein the polyfunctional halogen compound is tin tetrachloride.

12. A process according to claim 4, wherein the polyfunctional halogen compound is selected from the group consisting of dimethylsilicon dichloride, monomethylsilicon trichloride, silicon tetrachloride, tin tetrachloride and germanium tetrachloride.

13. A process according to claim 5, wherein the polyfunctional halogen compound is selected from the group consisting of dimethylsilicon dichloride, monomethylsilicon trichloride, silicon tetrachloride, tin tetrachloride and germanium tetrachloride.

14. A process according to claim 12, wherein the polyfunctional halogen compound is tin tetrachloride.

15. A process according to claim 13, wherein the polyfunctional halogen compound is tin tetrachloride.

* * * * *